April 18, 1944.  A. R. EWING  2,346,739
REAR VIEW MIRROR
Filed July 19, 1941
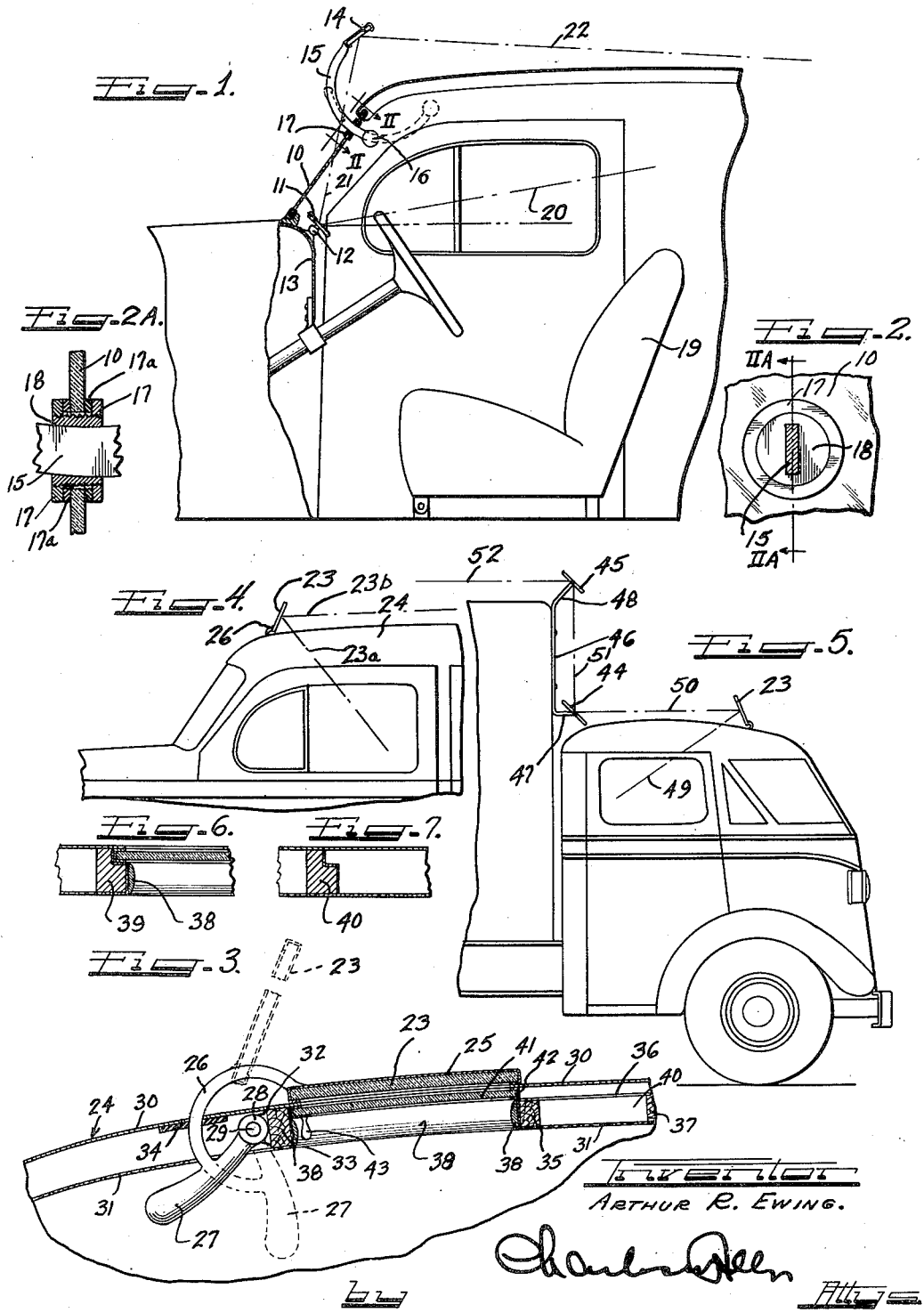
Inventor
ARTHUR R. EWING.

Patented Apr. 18, 1944

2,346,739

UNITED STATES PATENT OFFICE 2,346,739

REAR VIEW MIRROR

Arthur R. Ewing, Chicago, Ill.

Application July 19, 1941, Serial No. 403,112

2 Claims. (Cl. 88—86)

The invention relates generally to a rear view mirror and is directed more particularly to a mirror arrangement whereby a more full vision is obtained toward the rear and sides of the car to which it is attached.

Various disadvantages have accompanied the use of rear view mirrors upon passanger cars in the past. With the usual arrangement the mirror is placed above the windshield and is directed rearwardly through the interior of the car toward the rear window thereof. With the use of such a mirror the vision of the driver rearwardly is effectively blocked by the heads of passengers seated in the rear seat. Furthermore, the rearward vision toward the side is obstructed by the presence of the side panels located on each side of the rear window. Under these circumstances the vision of the driver directly rearwardly is obstructed from time to time while his vision toward the sides is obstructed by the above-mentioned panels to such an extent that it is difficult or impossible for him to tell whether another car is approaching him from the rear and to one side. A large percentage of the accidents occur because of faulty rear vision caused by the above conditions.

Many disadvantages also accompany the use of rear vision mirrors upon trucks, particularly those wherein the cab is lower than the body portion at the rear of the cab. Because of the height of the body portion of a truck or because of the lack of an adequate rear window therein, it is customary to use rear view mirrors of the type which are attached to the driver's side of the cab and extend outwardly therefrom. While such a mirror is sufficient to provide rear vision on one side of the vehicle, the driver cannot see a car approaching him from the rear on the other side and, furthermore, he does not obtain an even rear view of the road behind him. Furthermore, in vehicles in which the body portion is higher than the cab, merchandise may be stolen from the body without the driver being aware of the presence of the thief on the top of his load or on the roof of the body portion of the truck.

To the end that the above disadvantages may be avoided and as an object of the invention there is provided herein a rear vision mirror assembly which affords a complete view of the road behind the car; which is so arranged that the driver's vision is unobstructed by permanent structures of the car body or by the presence of passengers in the rear seat; which affords the driver a rear, center view together with an unobstructed rear side view of the road behind him; which affords the driver a short range as well as a long range view of the road behind him and which permits the driver of a truck to view the roof thereof at all times thereby protecting him against theft and pilfering of the goods he is carrying.

Other objects and advantages of the invention will become apparent from the following specification and the accompanying drawing in which:

Figure 1 is a fragmentary cross-sectional view of a vehicle embodying one form of the invention;

Figure 2 is a cross-section view taken on the line II—II of Figure 1;

Figure 2a is a cross-sectional view taken on the line IIa—IIa of Figure 2.

Figure 3 is a fragmentary cross-sectional view of the roof of a vehicle embodying a modified form of the invention;

Figure 4 is a side-elevational view of a vehicle embodying the form of the invention shown in Figure 3; and Figure 5 is a side elevation of a truck embodying a further modified form of the invention.

Figures 6 and 7 are cross-sectional views showing details of construction of the embodiment shown in Figure 3.

It will be understood that the embodiments shown herein are for illustrative purposes and may be changed or modified without departing from the spirit and scope of the invention as set forth in the appended claims.

As shown in Figure 1, a rear view mirror mounting structure is incorporated in a vehicle by attachment through the windshield 10. The assembly includes a mirror 11 mounted for adjustment as by a ball joint arrangement 12 upon the cowl above the instrument board 13 of the vehicle. The assembly further includes a mirror 14 suitably secured at the upper end of an arcuate arm 15 having a manipulating handle 16 at the lower end thereof and having its intermediate arcuate portion slidably arranged through the windshield for adjustment and retraction.

As shown in Figures 1, 2 and 2a suitable means for securing the arm 15 to the windshield 10 includes an externally threaded bushing 18 which is slotted to provide a rectangular passage for the arm 15 which as will be seen from Figure 2 has a rectangular cross section. The bushing 18 passes through an aperture in the windshield 10 and is secured therein by retaining nuts 17 which are internally threaded and are screwed on to the bushing 18 on each side of the glass. If desired a rubber gasket 17a may be interposed between the inner faces of the nuts 17 and the surface of the windshield 10 thereby to prevent rain or dust passing through the windshield at this point. The slot in the bushing 18 is of such a size that it affords a tight sliding fit for the arm 15 whereby the latter may be adjusted as shown in dotted lines in Figure 1.

From the foregoing it will be seen that the arm 15 is so mounted in the windshield that it may be manipulated arcuately by the handle 16 to either adjust the mirror 14 and the angle thereof or to retract the same into a receded position. Furthermore, while the mirror 14 may be adjusted as above described it is so retained with respect to the vehicle structure due to its rectangular cross-sectional shape that it cannot swing from side to side by twisting relative to the windshield.

Thus it will be seen that as a driver is seated in the seat 19 his line of vision will be through the mirror 11 along the broken line 20, from the mirror 11 to the mirror 14 along the broken line 21 and from the mirror 14 rearwardly over the top of the car along the broken line 22.

In order to accommodate drivers of different heights the above described mirror assembly may be easily adjusted by manipulation of the mirror 11 about the ball and socket joint 12 and further by manipulation of the mirror 14 by the handle 16. The mirror 14 may be of any desirable length so long as it establishes a sufficiently wide view toward the rear of the car. Furthermore, it may be formed into a convex surface to additionally broaden the view if desired.

In the modification shown in Figures 3 and 4 the mirror 23 is shown mounted on the roof 24 of a vehicle body. This construction is particularly advantageous in that in addition to providing an efficient rear view mirror it affords an open roof construction for additional ventilation and light in the interior of the car.

In this construction the mirror, to be protected from the elements, is provided with a suitable housing 25 which extends over the silvered back surface thereof and around the edges. The housing 25 is preferably composed of sheet metal and, to the end that the mirror may be adjusted toward an operative position wherein it faces rearwardly of the vehicle and in order that a ventilating space, to be described in detail presently, may be exposed, it is suitably attached as by spot welding or riveting to one end of an arcuate arm 26 the other end of which extends through the roof of the car and terminates in a manipulating handle 27 in the interior thereof. In the present embodiment the arcuate member 26 is joined integrally with the handle 27 at an intermediate point thereof and the remote end of the handle is formed into a bearing 28 by means of which the handle is pivotable about a rod 29 disposed laterally of the car top between the outer metallic section 30 thereof and the inner fabric section 31 thereof. The rod 29 is suitably mounted as by lugs 32, a portion of one of which is shown as secured on the adjacent side surface of a spacer 33. Preferably an apertured member 34 of rubber or the like may be secured to the inner surface of the section 30 of the roof of the vehicle whereby the passage of dirt and rain is prevented and whereby a friction, sliding fit for the member 26 is provided.

To the end that the driver is afforded a clear view of the mirror 23 as he sits in driving position the roof 24 of the vehicle is provided with an opening. As will be seen from Figure 3 the outer section 30 of the roof is broken away to provide an opening in that section, the opening having a width substantially equal to the width of the mirror 23. Forwardly of this opening there is provided the above mentioned spacer 33 around the bottom and rear surface of which the adjacent edge of the fabric 31 is secured. Another spacer 35 is provided along the rear edge of the opening and also extends laterally of the car top, this spacer 35, however, being of less height than the distance between the metallic section 30 and the fabric section 31 of the roof. Similarly the adjacent edge of the fabric 31 is secured around the bottom and forward side surfaces of the spacer 35. If desired, the exposed surfaces of the spacers 33 and 35 may be provided with upholstery 38 to improve the appearance of the construction from the interior of the car.

The top surface of the spacer 35 retains the forward edge of a slideway flooring 36 made of sheet metal or the like, the rear edge of the flooring 36 being similarly retained by another spacer 37. As will be seen from the foregoing, the member 36 together with the opposed portion of the roof section 30 provides a slideway, the lateral limits of the slideway being provided by suitable longitudinally disposed spacers, those on the right-hand side of the vehicle shown in Figures 3 and 4 being shown at 39 and 40 in Figures 3, 6 and 7.

As will be seen from Figure 6 the spacer 39 is cut away at its upper inner surface to provide a slideway, while as shown in Figure 7, the spacer 40 is similarly cut away to likewise afford a slideway. As stated above like spacers 39 and 40 are also provided at the opposite lateral limit of the opening in the roof 24 of the vehicle.

A window, adapted to be closed when the weather is bad and yet afford a clear view of the mirror and adapted to be opened when the weather is clear to afford additional ventilation for the interior of the vehicle is shown at 41. This window may be of any suitable construction and in the present instance is provided with a suitable metallic border channel 42 the forward section thereof having a handle 43 secured thereto as by welding or the like. As will be seen from Figure 3 the window together with its protecting border channel is of a thickness sufficient to provide a sliding fit in the slideway provided between the slideway flooring 36, the opposed portion of the roof section 30 of the vehicle and the opposed longitudinally extending spacers 39 and 40 which are located on each side of the opening in the roof.

From the foregoing it will be seen that in order to position the mirror 23 in readiness for use the driver merely manipulates the handle 27 by moving it downwardly (see dotted lines in Figure 3), thereby drawing the member 26 through the roof of the vehicle into the interior thereof whereby the mirror is raised to operative position. Thereafter the driver may, if he so desires, open the interior of the car through the roof by moving the handle 43 and thus the window 41 rearwardly into its slideway. From Figure 4 it will be seen that the vision to the rear is along the broken lines 23a and 23b.

In Figure 5 a mirror assembly particularly well adapted for use on trucks having high bodies is shown.

The primary mirror 23 in this construction is mounted similarly and in a similar environment to that shown Figures 3 and 4. However, there are additionally provided mirrors 44 and 45 whereby the driver not only has a clear vision of the entire road behind him but also has a clear view of the top of the truck thereby to protect himself against theft and pilfering of merchandise.

Any suitable means may be provided for mounting the mirrors 44 and 45 for adjustment such as one or more bracket members, one of which is shown in Figure 5 as having a shank portion 46 and a forwardly bent arm 47. The mirror 44 is suitably pivotally mounted at the forward end of the arm or arms 47 while the second mirror 45 is pivotally mounted on an arm 48 at the upper end of the shank 46.

From Figure 5 it will be seen that the driver obtains a view of the top of the truck and of the road to the rear thereof through mirrors 23, 44 and 45 along lines of vision 49, 50, 51 and 52 respectively. Thus in addition to having a rear view which includes both sides of the truck, the driver may periodically inspect the rear and top of the truck to prevent theft and pilfering of merchandise.

From the foregoing it will be seen that there has been provided a rear view mirror assembly which affords greatly improved vision; which is retractable into an inconspicuous position to conform to the streamlined effect found in modern vehicles; which is readily adjustable to accommodate drivers of different heights; which, when regulated to operative position, affords additional ventilation for the interior of the vehicle and which reduces the possibilities of theft and pilferage when used on trucks.

It is to be understood that for the purposes of the claims herein, the "body" of the car may be interpreted to include the windshield.

What I claim is:

1. In a rear view mirror assembly for a vehicle, a mirror mounted on the vehicle above and in the vicinity of the driving position, means for adjustably mounting the mirror, said means terminating in an operating handle in the interior of the vehicle and including an arcuate intermediate portion having a sliding friction engagement with that portion of the vehicle through which it passes, said handle being positioned to be operable by the driver when seated in driving position to regulate the mirror for the rear view desired.

2. In a vehicle, a rear view mirror assembly including an arcuate arm mounted in slidable relationship through the body of the vehicle, a mirror mounted on the outer end of said arm and an operating handle at the inner end thereof, said mirror being adjustable to obtain the rear view desired by manipulation of said handle and said arm.

ARTHUR R. EWING.